United States Patent [19]
Fukuda

[11] Patent Number: 4,571,613
[45] Date of Patent: Feb. 18, 1986

[54] NOISE REDUCTION CIRCUIT FOR A VIDEO SIGNAL USING A FEEDBACK TYPE COMB FILTER AND AN EQUALIZER CIRCUIT

[75] Inventor: Hisatoshi Fukuda, Yokohama, Japan

[73] Assignee: Victor Company of Japan Ltd., Yokohama, Japan

[21] Appl. No.: 677,169

[22] Filed: Dec. 3, 1984

[30] Foreign Application Priority Data

Dec. 5, 1983 [JP] Japan .................................. 58-229348

[51] Int. Cl.⁴ ............................................. H04N 9/64
[52] U.S. Cl. ..................................................... 358/36
[58] Field of Search ..................................... 358/36, 31

[56] References Cited

U.S. PATENT DOCUMENTS 3,836,707  9/1974  Murakami et al. .................. 358/36
4,291,330  9/1981  Hirai ..................................... 358/36
4,390,894  6/1983  Raven ................................... 358/36
4,513,311  4/1985  Hirai et al. ............................ 358/31

Primary Examiner—John W. Shepperd
Attorney, Agent, or Firm—Ladas & Parry

[57] ABSTRACT

A noise reduction circuit for a video signal, comprises a feedback type comb filter in which an output video signal of a delay circuit which delays a video signal by one or two horizontal scanning periods, is fed back to an input side of the delay circuit through a feedback path, and an equalizer circuit coupled in series with the feedback type comb filter. The feedback path comprises a highpass or bandpass filter circuit, a limiter, and a coefficient multiplier which are coupled in series. The equalizer circuit has a frequency characteristic approximately complementary to an envelope characteristic in a frequency characteristic of the feedback type comb filter.

4 Claims, 12 Drawing Figures

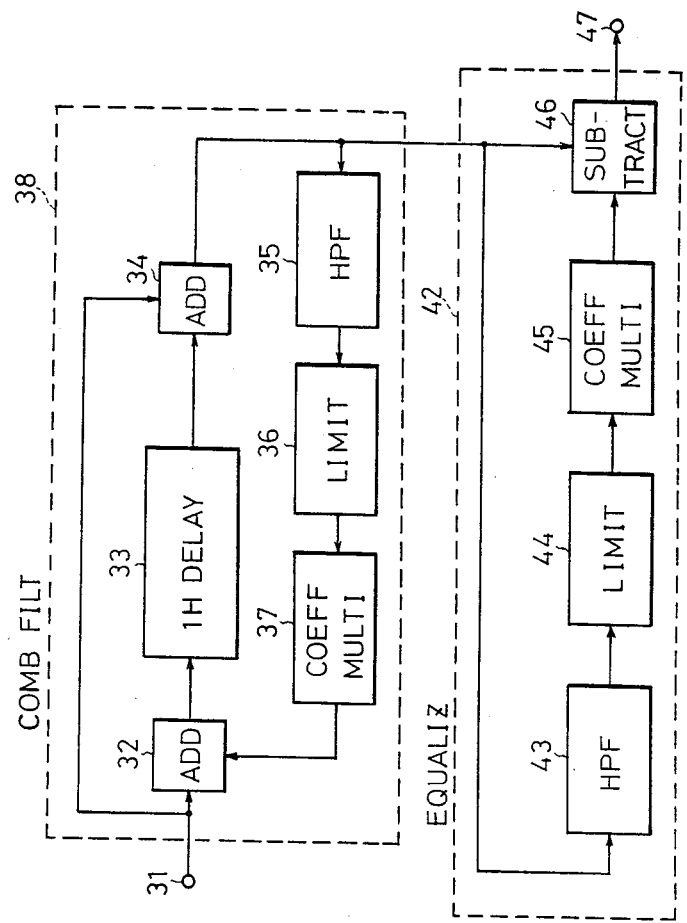

NOISE REDUCTION CIRCUIT FOR A VIDEO SIGNAL USING A FEEDBACK TYPE COMB FILTER AND AN EQUALIZER CIRCUIT

BACKGROUND OF THE INVENTION

The present invention generally relates to noise reduction circuits for video signals, and more particularly to a noise reduction circuit in which a feedback loop of a feedback type comb filter is constituted by a circuit including a filter circuit, a limiter, and a coefficient multiplier which are coupled in series, and an equalizer circuit is coupled to the feedback type comb filter, so that it is possible to perform an optimum noise reduction and prevent deterioration in the vertical resolution depending on the amplitude of an input video signal, and so that it is also possible to obtain a satisfactory input pulse versus output pulse characteristic with respect to an input video signal which is in the form of a pulse signal.

Conventionally, a noise reduction circuit is provided in a luminance signal reproducing system of a helical scan type magnetic recording and/or reproducing apparatus (video tape recorder or VTR), for example, so as to reduce noise within a reproduced luminance signal after a frequency demodulation. For example, in a first conventional noise reduction circuit, the reproduced luminance signal which is reproduced from a magnetic tape and is demodulated in a frequency demodulator, is applied to an input terminal and is passed through a highpass filter so as to obtain only a frequency component of over 1 MHz, for example. An output signal of the highpass filter is passed through a limiter and a coefficient multiplier, and is supplied to a subtracting circuit. The subtracting circuit subtracts the output signal of the coefficient multiplier from the video signal (reproduced luminance signal, for example) applied to the input terminal. The noise which is visually conspicuous to the human eye, is generally concentrated in a low-level part of the high-frequency component. Hence, a video signal in which the visually conspicuous noise is eliminated, is produced from the subtracting circuit and is obtained through an output terminal.

On the other hand, in a second conventional noise reduction circuit, the video signal (reproduced luminance signal, for example) which is applied to an input terminal, is supplied to a 1H delay circuit wherein the video signal is delayed by a delay time of 1H, where H represents one horizontal scanning period. An output delayed video signal is supplied to a first subtracting circuit. The first subtracting circuit subtracts the output delayed video signal of the 1 H delay circuit from the video signal applied to the input terminal. In the video signal, information contents which are separated by an interval of 1H are extremely similar to each other, and the so-called vertical correlation (line correlation) exists, as is well known. However, the vertical correlation does not exist for the noise. As a result, a signal made up of the noise and a video signal component having no vertical correlation, is obtained from the first subtracting circuit. The output signal of the first subtracting circuit is subjected to an amplitude limitation in a limiter which has a limiting level in the range of a peak-to-peak value of the noise. An output signal of the limiter is supplied to a second subtracting circuit which subtracts the output signal of the limiter from the video signal applied to the input terminal. Consequently, a video signal in which the noise is greatly reduced, is produced from the second subtracting circuit and is obtained through an output terminal.

Further, there is a third conventional noise reduction circuit comprising a feedback type comb filter. This third conventional noise reduction circuit will be described later in detail in conjunction with a drawing. According to the third conventional noise reduction circuit, a video signal (reproduced luminance signal, for example) is applied to an input terminal, and is supplied to the feedback type comb filter which eliminates the noise and obtains a video signal component having the vertical correlation. An output signal of the feedback type comb filter is supplied to a subtracting circuit which subtracts the output signal of the feedback type comb filter from the video signal applied to the input terminal, so as to obtain a signal made up of the noise included within the video signal and a video signal component having no vertical correlation. The output signal of the subtracting circuit is passed through a lowpass filter which obtains only a low-frequency component of the output signal of the subtracting circuit. The output signal of the feedback type comb filter has a predetermined characteristic after being passed through an equalizer circuit. The output signal of the lowpass filter and an output signal of the equalizer circuit are added in an adding circuit. As a result, a signal in which the noise is eliminated, is produced from the adding circuit and is obtained through an output terminal.

The frequency characteristic of the third conventional noise reduction circuit is flat in a frequency band under a cutoff frequency $f_c$ of the lowpass filter, but has a comb filter characteristic in a frequency band over the cutoff frequency $f_c$ so as to pass frequency components which are natural number multiples of a horizontal scanning frequency $f_H$. Thus, according to the third conventional noise reduction circuit, it is possible to eliminate the noise in the high-frequency band over the cutoff frequency $f_c$. Further, it is possible to prevent deterioration in the vertical resolution which is visually conspicuous in the low-frequency band under the cutoff frequency $f_c$.

However, in a case where the video signal applied to the input terminal has an edge of a large amplitude, a high-frequency component of the edge is obtained from the highpass filter in the first conventional noise reduction circuit described before. Thus, in the first conventional noise reduction circuit, the video signal and the noise in the vicinity of the edge are eliminated by the amplitude limitation performed in the limiter. As a result, there is a problem in that a video signal in which the edge noise still remains in the vicinity of the edge where the amplitude limitation is performed in the limiter, is produced from the subtracting circuit and is obtained through the output terminal.

Especially during a long-time mode of a VTR for home use, in which the recording and reproduction are carried out with respect to a given length of magnetic tape for a time which is longer than the recording and reproducing times during a normal mode by making the track width extremely narrow, the signal-to noise (S/N) ratio of the reproduced video signal is poor because the track width is narrow and the relative linear speed between the magnetic tape and a head is slow. In addition, the crosstalk from adjacent tracks is large, and the edge noise is visually conspicuous in the reproduced picture. For this reason, the S/N ratio cannot be improved sufficiently according to the first conventional noise reduction circuit.

Further, in the VTR for home use, the noise is also distributed in the low-frequency band under 1 MHz. Since the first conventional noise reduction circuit is only effective with respect to the noise over the cutoff frequency of the highpass filter, it is also impossible to obtain the noise reducing effect with respect to the noise in the low-frequency band at parts other than the edge of the video signal.

In a case where the video signal applied to the input terminal has the vertical correlation, the second conventional noise reduction circuit is superior compared to the first conventional noise reduction circuit in that the second conventional noise reduction circuit can eliminate the edge noise and improve the S/N ratio. However, although the S/N ratio can be improved theoretically by 3 dB, the S/N ratio can only be improved by approximately 1.5 dB to 2.0 dB in actual practice. Moreover, the second conventional noise reduction circuit has a comb filter characteristic which passes frequencies which are natural number multiples of the horizontal scanning frequency $f_H$ to the same extent throughout the entire frequency band. As a result, the vertical resolution becomes deteriorated, and there is a problem in that the deterioration in the vertical resolution is visually conspicuous especially in the low-frequency band.

On the other hand, the third conventional noise reduction circuit is advantageous in that it is possible to reduce the edge noise described before. However, there is a problem in that the low-frequency noise (in the range of 1 MHz) which are visually conspicuous especially in the reproduced picture obtained in the VTR, cannot be reduced in the low-frequency band under the cutoff frequency $f_c$ of the lowpass filter. In this case, it is possible to reduce the low-frequency noise by lowering the cutoff frequency $f_c$ of the lowpass filter to a frequency in the range of 1 MHz, however, a coefficient of a coefficient multiplier within the feedback type comb filter must be set to a large value in order to obtain a desired S/N ratio improvement factor which is greater than the S/N ratio improvement factor obtainable in the second conventional noise reduction circuit. For this reason, the comb filter characteristic becomes sharp, and the vertical resolution is greatly deteriorated in the frequency band over the cutoff frequency $f_c$ of the lowpass filter. The deterioration in the vertical resolution is visually conspicuous in a frequency range of 1 MHz to 2 MHz. Hence, the cutoff frequency $f_c$ of the lowpass filter must inevitably be set to a frequency in the range of 2 MHz to 3 MHz, and it is virtually impossible to improve the S/N ratio in the low-frequency band by the desired improvement factor so as to reduce the low-frequency noise which are visually conspicuous especially in the reproduced picture obtained in the VTR.

SUMMARY OF THE INVENTION

Accordingly, it is a general object of the present invention to provide a novel and useful noise reduction circuit for a video signal, in which the problems described heretofore are eliminated.

Another and more specific object of the present invention is to provide a noise reduction circuit for a video signal, which comprises a circuit including a highpass filter or a bandpass filter and a limiter which are coupled in series, within a feedback loop of a feedback type comb filter, and passes an output signal of the feedback type comb filter through an equalizer circuit having a predetermined characteristic, so that an output video signal of the equalizer circuit is obtained through an output terminal. According to the noise reduction circuit of the present invention, it is possible to reduce the low-frequency noise which is visually conspicuous especially in the reproduced picture obtained in the VTR and improve the S/N ratio to such an extent that the vertical resolution is hardly deteriorated. Moreover, it is possible to greatly improve the S/N ratio in the high-frequency band, that is, by approximately 6 dB to 10 dB.

Still another object of the present invention is to provide a noise reduction circuit in which an equalizer circuit having an open loop construction and comprising a limiter and a filter circuit in a non-feedback path thereof, is coupled to an output side of a feedback type comb filter having a limiter and a filter circuit in a feedback path thereof. According to the noise reduction circuit of the present invention, it is possible to reduce the edge noise in which the vertical correlation exists, and improve the input pulse versus output pulse characteristic with respect to an input pulse signal. Moreover, the noise which cannot be reduced, is greatly suppressed in the high-frequency range by the comb filter. As a result, the phenomenon in which trails are formed in the horizontal direction of the picture, can be made less visually conspicuous. In addition, because the S/N ratio can be improved considerably in the feedback type comb filter for the high-frequency range with respect to the input video signal having a small level, the attenuation need not be large in the equalizer circuit in this case. Accordingly, the frequency characteristic with respect to the input video signal having a small level is improved, and it is possible to clearly reproduce the contours of images in the reproduced picture.

Other objects and further features of the present invention will be apparent from the following detailed description when read in conjunction with the accompanying drawings.

BRIEF DESCRIPTION OF THE DRAWINGS

FIGS. 3A and 3B are systematic block diagrams respectively showing first and second embodiments of a noise reduction circuit according to the present invention;

DETAILED DESCRIPTION

Figure 1:
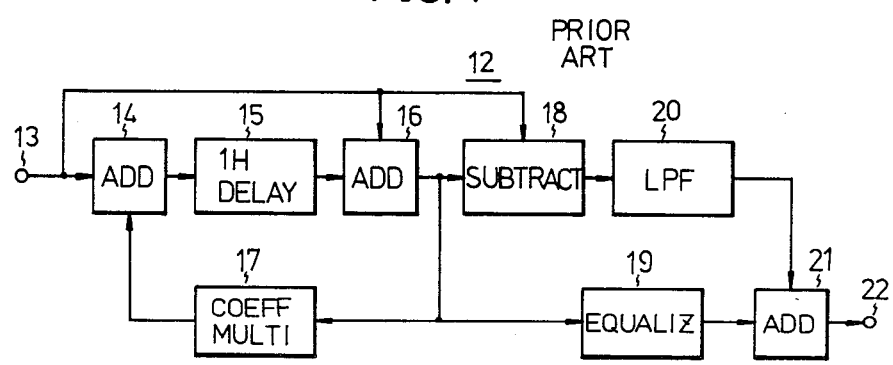
FIG. 1 is a systematic block diagram showing an example of a conventional noise reduction circuit.

A noise reduction circuit 12 shown in FIG. 1, is the third conventional noise reduction circuit described before. In FIG. 1, an input video signal (a reproduced luminance signal, for example) is applied to an input terminal 13, and is supplied to a 1H delay circuit 15 through an adding circuit 14, where H represents one horizontal scanning period of the input video signal. An output signal of the adding circuit 14 which is delayed by a delay time of 1H in the 1H delay circuit 15, is supplied to an adding circuit 16. The adding circuit 16 adds the output signal to the 1H delay circuit 15 and the input video signal applied to the input terminal 13, and produces a video signal component which has the vertical correlation and is reduced of the noise. The output video signal component of the adding circuit 16 is supplied to a coefficient multiplier 17 which multiplies a coefficient to the video signal component, and output signal of the coefficient multiplier 17 is fed back to the adding circuit 14.

The adding circuit 14, the 1H delay circuit 15, the adding circuit 16, and the coefficient multiplier 17, constitute a feedback type comb filter. The feedback type comb filter has a comb filter characteristic in which center frequencies of pass bands are even number multiples of $\frac{1}{2}$ the horizontal scanning frequency $f_H$, and center frequencies of attenuation bands are odd number multiples of $f_H/2$.

An output signal of the feedback type comb filter, that is, the output signal of the adding circuit 16, is subtracted from the input video signal applied to the input terminal 13, in a subtracting circuit 18. As a result, a signal made up of the noise within the input video signal and a video signal component having no vertical correlation, is obtained from the subtracting circuit 18. The output signal of the subtracting circuit 18 is supplied to a lowpass filter 20 having a cutoff frequency $f_c$. Only a low-frequency component is obtained from the lowpass filter 20, and this low-frequency component is supplied to an adding circuit 21.

On the other hand, the output video signal of the adding circuit 16 is supplied to an equalizer circuit 19, and a signal having a predetermined characteristic is obtained from the equalizer circuit 19. The output signal of the equalizer circuit 19 is supplied to the adding circuit 21 and is added with the output low-frequency component of the lowpass filter 20. An output signal of the adding circuit 21 is obtained through an output terminal 22.

Figure 2:
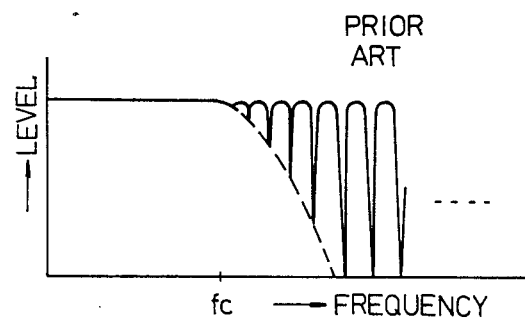
FIG. 2 shows a frequency characteristic of the block system shown in FIG. 1.

The conventional noise reduction circuit shown in FIG. 1, has a frequency characteristic shown in FIG. 2. As may be seen from FIG. 2, the conventional noise reduction circuit has a frequency characteristic which is flat in a frequency band under the cutoff frequency $f_c$ of the lowpass filter 20, and has a feedback type comb filter characteristic in which center frequencies of pass bands are natural number multiples of the horizontal scanning frequency $f_H$. For this reason, according to the conventional noise reduction circuit shown in FIG. 1, it is possible to reduce the noise in the high-frequency band over the cutoff frequency $f_c$, and it is possible to prevent deterioration in the vertical resolution which is visually conspicuous in the low-frequency band under the cutoff frequency $f_c$.

However, in this conventional noise reduction circuit, the cutoff frequency $f_c$ of the lowpass filter 20 is inevitably selected to a frequency in the range of 2 MHz to 3 MHz. Thus, as may be seen from the frequency characteristic shown in FIG. 2, there is a problem in that it is impossible to reduce the low-frequency noise (in the range of 1 MHz) which is visually conspicuous especially in the reproduced picture obtained in the VTR.

Next, description will be given with respect to embodiments of the noise reduction circuit according to the present invention, in which the problems of the conventional noise reduction circuit are eliminated.

Figure 3A:
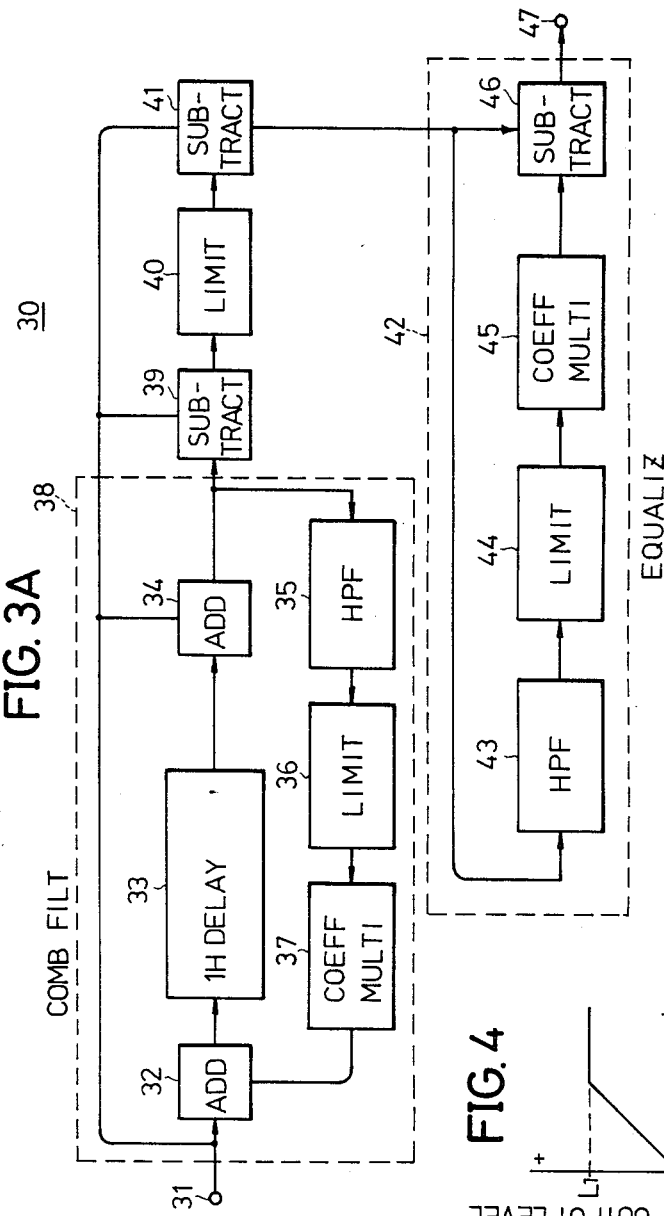

FIG. 3A shows a first embodiment of a noise reduction circuit 30 according to the present invention. In FIG. 3A, an input video signal including noise, is applied to an input terminal 31. For example, the input video signal is a reproduced luminance signal which is obtained by reproducing a frequency modulated luminance signal from a recording medium and then passing the reproduced frequency modulated luminance signal through a de-emphasis circuit or the like. The input video signal (reproduced luminance signal) is passed through an adding circuit 32 and is supplied to a 1H delay circuit 33 wherein the signal is delayed by 1H. An output video signal of the 1H delay circuit 33 is supplied to an adding circuit 34. On the other hand, the input video signal is also supplied directly to the adding circuit 34 and is added with the output video signal of the 1H delay circuit 33. An output video signal of the adding circuit 34 is supplied to a highpass filter 35 which attenuates a low-frequency component under a cutoff frequency $f_{c12}$, and filters a high-frequency component over the cutoff frequency $f_{c12}$. The output high-frequency component of the highpass filter 35 is supplied to a limiter 36 wherein the high-frequency component is amplitude-limited.

Figure 4:
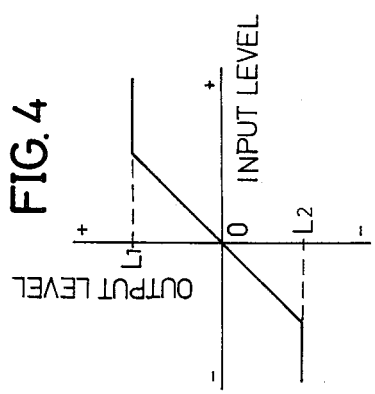
FIG. 4 shows an input versus output characteristic of a limiter in the block systems shown in FIGS. 3A and 3B.

The limiter 36 has a frequency characteristic shown in FIG. 4. The output high-frequency component of the highpass filter 35, having an amplitude between limiting levels $L_1$ and $L_2$, is passed as it is through the limiter 36. On the other hand, the output high-frequency component of the highpass filter 36, having an amplitude which exceeds the limiting level $L_1$ or $L_2$, is amplitude-limited to the limiting level $L_1$ or $L_2$ by the limiter 36. An output signal of the limiter 36 is supplied to a coefficient multiplier 37 which multiplies a coefficient k to the signal, where k is greater than zero and less than one. An output signal of the coefficient multiplier 37 is supplied to the adding circuit 32 and is added with the input video signal, and the output signal of the adding circuit 32 is supplied to the 1H delay circuit 33.

In other words, the adding circuit 32, the 1H delay circuit 33, the adding circuit 34, the highpass filter 35, the limiter 36, and the coefficient multiplier 37, constitute a feedback type comb filter 38. A feedback path of this feedback type comb filter 38 is constituted by a circuit including the highpass filter 35, the limiter 36, and the coefficient multiplier 37 which are coupled in series. Hence, a video signal having a frequency characteristic in which the center frequencies of the pass bands are even number multiples of $f_H/2$ and the center frequencies of the attenuation bands are odd number multiples of $f_H/2$, is obtained from the adding circuit 34.

Because the limiter 36 is provided in the feedback path of the feedback type comb filter 38, the characteristic of the feedback type comb filter 38 changes depending on the amplitude of the input video signal and the extent to which the vertical correlation exists in the input video signal. The video signal (reproduced luminance signal) which is obtained from the adding circuit 34, is made up of frequency components having frequencies which are even number multiples of $f_H/2$, that is, made up of video signal components in which the vertical correlation exist. Thus, in a high-frequency band over the cutoff frequency $f_{c12}$ of the highpass filter 35, the amplitude of the signal at the input side of the limiter 36 becomes smaller as the extent to which the vertical correlation exists in the input video signal becomes smaller, and the amplitude of the signal at the input side of the limiter 36 becomes approximately proportional to the amplitude of the input video signal when the vertical correlation exists to a certain extent in the input video signal.

In a case where the input video signal applied to the input terminal 31 is such that the amplitude of the signal at the input side of the limiter 36 is small and lies within the limiting levels $L_1$ and $L_2$, the output signal of the highpass filter 35 passes through the limiter 36 as it is and is supplied to the coefficient multiplier 37. Hence, the feedback ratio of the high-frequency component which passes through the highpass filter 35, becomes large compared to the low-frequency component. The value of the coefficient k with respect to the high-frequency component, becomes large compared to the value of the coefficient k with respect to the low-frequency component. As a result, the frequency characteristic of the feedback type comb filter 38 with respect to such an input video signal becomes as shown in FIGS. 5(A) and 6(A) in which the pass bands in the high-frequency band over the frequency $f_{c12}$ are narrow compared to the pass bands in the low-frequency band under the frequency $f_{c12}$.

Figure 5:
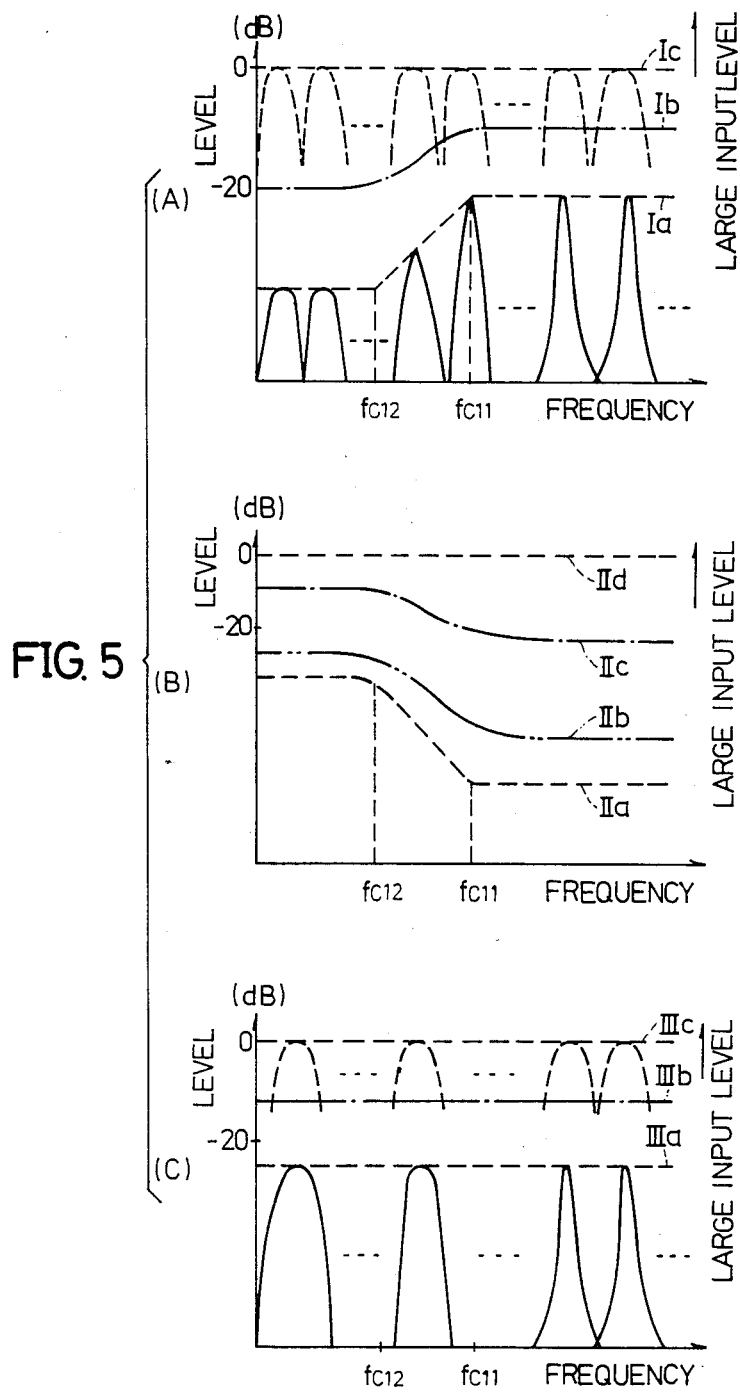
FIGS. 5(A) through 5(C) show examples of frequency characteristics at parts of the block systems shown in FIGS. 3A and 3B.
Figure 6:
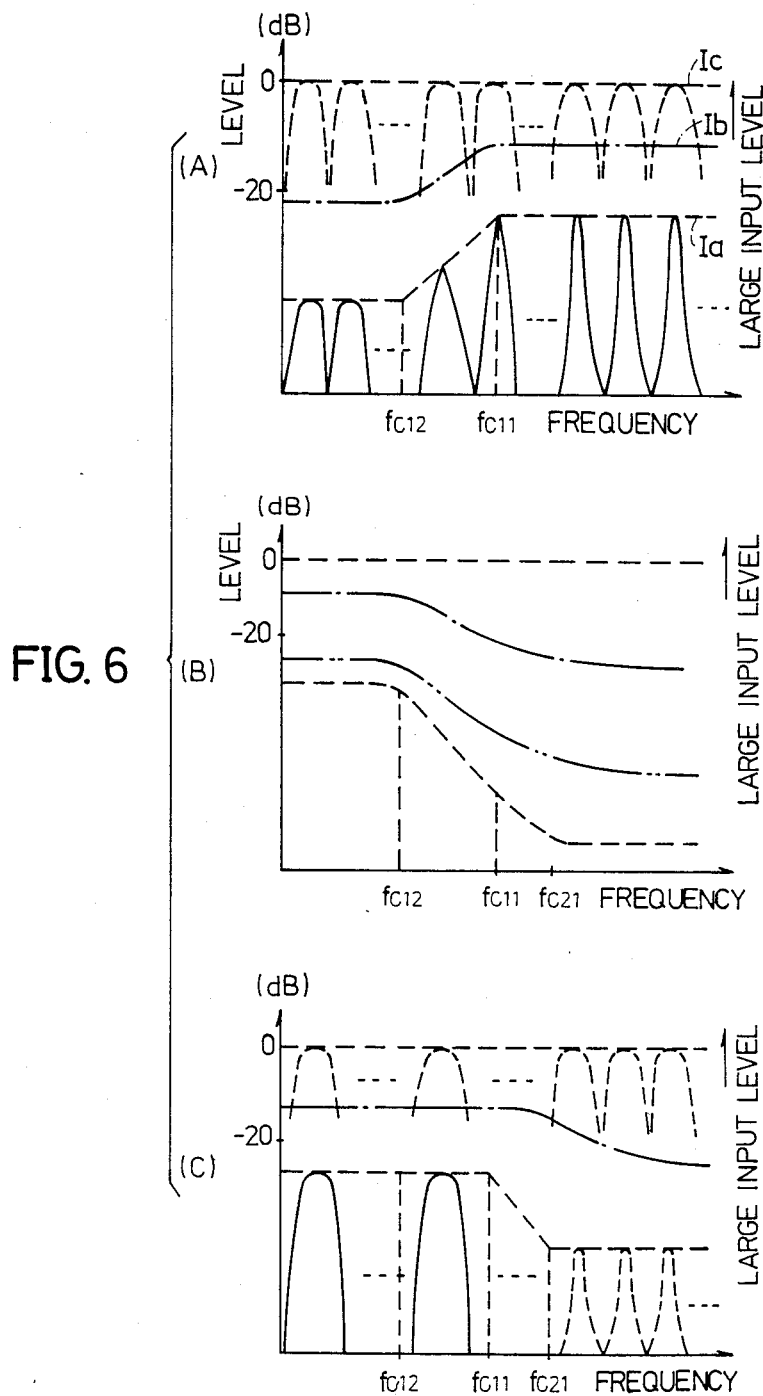
FIGS. 6(A) through 6(C) show other examples of frequency characteristics at parts of the block systems shown in FIGS. 3A and 3B.

An envelope characteristic Ia indicated by phantom lines in FIGS. 5(A) and 6(A), which is obtained by connecting peak levels of each of the pass bands in the frequency characteristic of the feedback type comb filter 38, is flat in the frequency band over a frequency $f_{c11}$ and in the frequency band under the frequency $f_{c12}$. Further, the envelope characteristic Ia slopes at a rate of $-6$ dB/oct between the frequencies $f_{c11}$ and $f_{c12}$. When it is assumed that the amplification of the 1H delay circuit 33 is equal to one, the coefficient k of the coefficient multiplier 37 is greater than zero and less than one, the feedback ratio obtained by the highpass filter 35 is represented by $\beta$, the input signal voltage applied to the input terminal 31 is represented by $e_i$, and the output signal voltage of the adding circuit 34 is represented by $e_o$, the output signal voltage $e_o$ can be described by an equation $e_o = (e_i + k \cdot \beta \cdot e_o) + e_i$. Thus, the transfer function of the feedback type comb filter 38 can be described by the following equation (1), when it is assumed that a perfect vertical correlation exists in the signal.

$$e_o/e_i = 2/(1 - k \cdot \beta) \tag{1}$$

When it is assumed that the highpass filter 35 is constituted by a capacitor C and a resistor R, that an equation $C \cdot R = T$ stands between the capacitance and the resistance of the capacitor C and the resistor R, and that the angular frequency of the input signal is represented by $\omega$, the following equation (2) can be obtained.

$$\beta = j\omega T/(1 + j\omega T) \tag{2}$$

Accordingly, the following equation (3) can be obtained when the equation (2) is substituted into the equation (1).

$$e_o/e_i = 2(1 + j\omega T)/[1 + j\omega(1 - k)T] \tag{3}$$

The equation (3) describes the envelope characteristic Ia in the frequency characteristic of the feedback type comb filter 38. The envelope characteristic Ia is flat in the high-frequency band over the frequency $f_{c11}$ ($=1/[2\pi(1-k)CR]$) which is determined by $(1-k)T$, flat in the low-frequency band under the frequency $f_{c12}$ ($f_{c12}=1/(2\pi CR)$, where $f_{c12}$ is less than $f_{c11}$) which is determined by T, and is attenuated at a rate of 6 dB/oct as the frequency decreases toward the frequency $f_{c12}$ from the frequency $f_{c11}$, as shown in FIGS. 5(A) and 6(A). The level difference between the frequencies $f_{c11}$ and $f_{c12}$ can be described by $20 \log [1/(1-k)]$ dB. For example, the frequency $f_{c12}$ is equal to 800 kHz, the frequency $f_{c11}$ is equal to 1.6 MHz, and the coefficient k is equal to 0.5.

On the other hand, in a case where the extent to which the vertical correlation exists in the input video signal is large and the amplitude of the input video signal is extremely large, even the low-frequency component in the output signal of the highpass filter 35 assumes a large amplitude which exceeds the limiting level $L_1$ or $L_2$ of the limiter 36. In this case, the comb filter characteristic of the feedback type comb filter 38 becomes as indicated by phantom lines Ic in FIGS. 5(A) and 6(A), which is similar to a comb filter characteristic of a comb filter having no feedback path. Further, the widths of the pass bands in the high-frequency band of the comb filter characteristic are relatively wide and are similar to the widths of the pass bands in the low-frequency band.

In a case where the amplitude of the input video signal is relatively large such that the high-frequency component in the output signal of the highpass filter 35 is amplitude-limited in the limiter 36 but the low-frequency component in the output signal of the highpass filter 35 passes through the limiter 36 as it is, the comb filter characteristic of the feedback type comb filter 38 becomes as indicated by one-dot chain lines Ib in FIGS. 5(A) and 6(A). Therefore, compared to a feedback type comb filter which has the same feedback ratio and but no limiter, it is possible to improve the input pulse versus output pulse characteristic with respect to a video signal having an extremely large level part which is related to the vertical direction of the picture, and improve the vertical resolution of the picture.

As described heretofore, the output video signal of the adding circuit 34 has one of the frequency characteristics shown in FIG. 5(A) or 6(A) depending on the level of the input video signal applied to the input terminal 31 and depending on the extent to which the vertical correlation exists in the input video signal applied to the input terminal 31. The output video signal of the adding circuit 34 is supplied to a subtracting circuit 39 and is subjected to a subtraction with the input video signal which is obtained from the input terminal 31. The output video signal of the adding circuit 34 is made up of the signal component which is within the input video signal (luminance signal) and has the vertical correlation. Thus, a signal made up of the noise included in the input video signal, the signal component having no vertical correlation, and a part of the signal having the vertical correlation, is obtained from the subtracting circuit 39. The output signal of the subtracting circuit 39 includes a part of the signal having the vertical correlation, because the output video signal of the adding circuit 34 has a frequency characteristic which is different from the frequency characteristic of the input video signal as may be seen from FIG. 5(A) or 6(A). The output signal of the subtracting circuit 39 is supplied to a limiter 40 wherein a large amplitude part in the range of the peak-to-peak value of the noise is amplitude-limited. An output signal of the limiter 40 is supplied to a subtracting circuit 41.

The subtracting circuit 41 subtracts the output signal of the limiter 40 from the input video signal which is obtained from the input terminal 31. Hence, a video signal which is reduced of the noise which appears in the vertical direction of the picture and is within the input video signal, is obtained from the subtracting circuit 41. The level of the signal component which is within the input video signal and has no vertical correlation, is normally larger than the level of the noise. A circuit part which is constituted by the subtracting circuits 39 and 41 and the limiter 40, is designed to minimize the deterioration in the vertical resolution by not subtracting from the input video signal the signal component which has no vertical correlation and has a level larger than the level of the noise. However, the noise reduction circuit according to the present invention will work in principle even without this circuit part, as may be seen from a second embodiment shown in FIG. 3B. In FIG. 3B, those parts which are the same as those corresponding parts in FIG. 3A are designated by the same reference numerals, and their description will be omitted.

In FIG. 3A, the output video signal of the subtracting circuit 41, which is reduced of the noise which appears in the vertical direction of the picture, is supplied to a highpass filter 43 and to a subtracting circuit 46 within an equalizer circuit 42. The equalizer circuit 42 comprises the highpass filter 43, a limiter 44, a coefficient multiplier 45, and the subtracting circuit 46. The highpass filter 43 has a construction similar to the construction of the highpass filter 35, and has a cutoff frequency $f_{c12}$. The limiter 44 and the coefficient multiplier 45 have constructions similar to the respective constructions of the limiter 36 and the coefficient multiplier 37. However, it is possible to change the time constant of the highpass filter 43, the limiting levels of the limiter 44, and the coefficient of the coefficient multiplier 45, according to the needs. The frequency characteristic of the equalizer circuit 42 becomes as indicated by a phantom line IIa in FIG. 5(B) with respect to the input video signal having a small amplitude (level) such that the signal applied to the limiter 44 will be passed through the limiter 44 as it is without being subjected to the amplitude limitation. In other words, since the coefficient of the coefficient multiplier 45 is less than one, the frequency characteristic of the equalizer circuit 42 is flat in the high-frequency band over the frequency $f_{c11}$, flat in the low-frequency range under the frequency $f_{c12}$, and slopes at a rate of $-6$ dB/oct in the frequency band between the frequencies $f_{c11}$ and $f_{c12}$. Thus, the frequency characteristic of the equalizer circuit 42 is complementary to the envelope characteristic Ia in the frequency characteristic of the feedback type comb filter 38 shown in FIGS. 5(A) and 6(A).

As the amplitude of the input video signal gradually becomes larger in the high-frequency band such that the signal level at the input side of the limiter 44 exceeds the limiting level of the limiter 44, the level of the output signal of the coefficient multiplier 45 becomes relatively small compared to the level of the output signal of the subtracting circuit 41. As a result, the frequency characteristic of the equalizer circuit 42 gradually changes as shown in FIG. 5(B), in the sequence of the characteristics IIa, IIb, IIc, and IId. In other words, the frequency characteristic of the equalizer circuit 42 is variable depending on the level of the high-frequency component of the input video signal, and is complementary to the frequency characteristic of the feedback type comb filter 38 shown in FIGS. 5(A) and 6(A). The equalizer circuit 42 performs the operation of reducing the noise in the video signal having a small level, but also reduces the high-frequency noise regardless of the existence of the vertical correlation in the video signal. An output video signal of the subtracting circuit 46, is obtained through an output terminal 47.

The frequency characteristic of the noise reduction circuit 30 shown in FIGS. 3A and 3B, is a sum of the frequency characteristics shown in FIGS. 5(A) and 5(B). Hence, when the input video signal applied to the input terminal 31 has a small level such that the signals applied to the limiters 36 and 44 will pass as they are, the frequency characteristic of the noise reduction circuit 30 assumes a comb-shaped characteristic as indicated by a solid line in FIG. 5(C). An envelope characteristic IIIa of this frequency characteristic, is a sum of the characteristics Ia and IIa shown in FIGS. 5(A) and 5(B). In the frequency characteristic indicated by the solid line in FIGS. 5(C), the center frequencies of the pass bands are even number multiples of $f_H/2$, and the center frequencies of the attenuation bands are odd number multiples of $f_H/2$. Further, the pass bands in the high-frequency band over the frequency $f_{c12}$ is sharper (narrower) compared to the pass bands in the low-frequency band under the frequency $f_{c12}$. Moreover, the envelope characteristic IIIa indicated by a phantom line in FIG. 5(C), which is obtained by connecting the peak levels of the pass bands, is substantially flat throughout the entire frequency band.

As the level of the input video signal applied to the input terminal 31 gradually becomes larger, the envelope characteristic in the frequency characteristic of the noise reduction circuit 30 gradually changes as shown in FIG. 5(C), in the sequence of the characteristics IIIa, IIIb, and IIIc. In addition, the widths of the pass bands in the high-frequency band over the frequency $f_{c12}$ gradually becomes wider, and finally become the same as the widths of the pass bands in the low-frequency band under the frequency $f_{c12}$. The frequency characteristic of the noise reduction circuit 30 shown in FIG. 5(C) changes depending on the level of the input video signal and the extent to which the vertical correlation exists in the input video signal. However, in the frequency characteristic shown in FIG. 5(C), the center frequencies of the pass bands are always even number multiples of $f_H/2$ and the center frequencies of the attenuation bands are always odd number multiples of $f_H/2$.

In a case where the curving point in the frequency characteristic of the equalizer circuit 42 is selected to a frequency $f_{c21}$ which is higher than the frequency $f_{c11}$, the frequency characteristic of the equalizer circuit 42 becomes as shown in FIG. 6(B). On the other hand, the frequency characteristic of the feedback type comb filter 38 becomes as shown in FIG. 6(A) which is the same as the frequency characteristic shown in FIG. 5(A). As a result, the frequency characteristic of the noise reduction circuit 30 obtained in this case, becomes as shown in FIG. 6(C).

Figure 7:
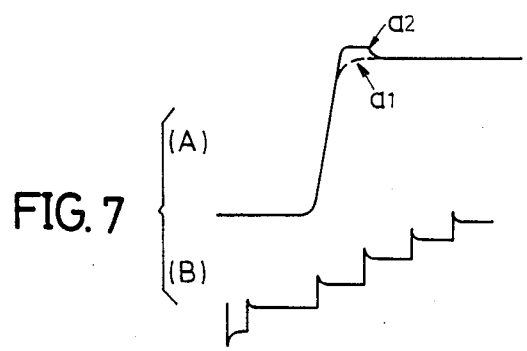
FIGS. 7(A) and 7(B) respectively show output signal waveforms of a feedback type comb filter within the block systems shown in FIGS. 3A and 3B, for cases where a pulse signal and a signal having a staircase waveform are applied to the feedback type comb filter as an input signal.
Figure 8:
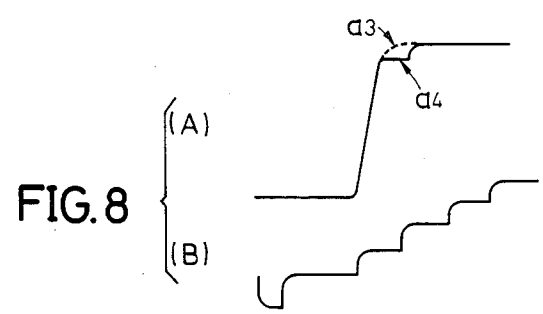
FIGS. 8(A) and 8(B) respectively show output signal waveforms of an equalizer circuit within the block systems shown in FIGS. 3A and 3B, for cases where a pulse signal and a signal having a staircase waveform are applied to the equalizer circuit as an input signal.
Figure 9:
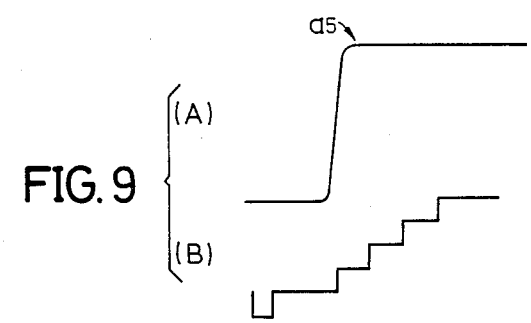
FIGS. 9(A) and 9(B) respectively show output signal waveforms obtained at an output terminal of the block systems shown in FIGS. 3A and 3B, for cases where a pulse signal and a signal having a staircase waveform are applied to an input terminal of the block systems shown in FIGS. 3A and 3B.

According to the present embodiment, the output signal waveform of the adding circuit 34 becomes as indicated by a solid line in FIG. 7(A) when the input video signal applied to the input terminal 31 has a waveform which is in the form of a sharp pulse. In FIG. 7(A), a part of the waveform which should originally be as indicated by a phantom line $a_1$, becomes as indicated by a solid line $a_2$. On the other hand, when the same video signal having the waveform which is in the form of the sharp pulse is supplied to the equalizer circuit 42, the output signal waveform of the subtracting circuit 46 becomes as indicated by a solid line in FIG. 8(A). In FIG. 8(A), a part of the waveform which should originally be as indicated by a phantom line $a_3$, becomes as indicated by a solid line $a_4$. In the present embodiment, the feedback type comb filter 38 and the equalizer circuit 42 are coupled in series, and thus, the waveform shown in FIG. 9(A) is obtained through the output terminal 47. In FIG. 9(A), the waveform is flat at a part $a_5$, and is approximately the same as the waveform of the input video signal applied to the input terminal 31. Therefore, according to the present embodiment, it is possible to improve the input pulse versus output pulse characteristic with respect to an input video signal having the form of a pulse.

In a case where the input video signal applied to the input terminal 31 has a staircase waveform, the output signal waveform of the feedback type comb filter 38 becomes as shown in FIG. 7(B). In FIG. 7(B), the waveform has parts where an overshoot occurs. When the same staircase waveform is supplied to the equalizer circuit 42, the output signal waveform of the equalizer circuit 42 becomes as shown in FIG. 8(B). Accordingly, when the staircase waveform is applied to the input terminal 31 of the noise reduction circuit 30, the waveform shown in FIG. 9(B) is obtained through the output terminal 47. The waveform shown in FIG. 9(B) is approximately the same as the waveform of the original signal which is applied to the input terminal 31.

According to the present embodiment, the feedback path of the feedback type comb filter 38 is essentially closed by the limiter 36 at least with respect to the input video signal having a large level, and the widths of the pass bands in the frequency characteristic of the feedback type comb filter 38 are widened. In addition, it is possible to improve the input pulse versus output pulse characteristic with respect to the horizontal and vertical directions of the picture, because the equalizer circuit 42 has a flat frequency characteristic which is similar to a frequency characteristic obtained when there is no signal path from the highpass filter 43 to the input side of the subtracting circuit 46. When the input video signal applied to the input terminal 31 has a small level, it is possible to improve the S/N ratio and keep the deterioration in the frequency characteristic to a minimum. Further, the noise (residual noise) which cannot be reduced by a noise reduction circuit only comprising the equalizer 42, can be suppressed greatly in the high-frequency range. Thus, the phenomenon in which trails are formed in the horizontal direction of the picture, can be made less visually conspicuous.

It is possible to couple the equalizer circuit 42 in series at the input side of the feedback type comb filter 38. However, the 1H delay circuit 33 generally comprises a charge coupled device (CCD) and a clock signal generator, and noise introduced from the clock signal generator may mix into the output signal of the 1H delay circuit 33. Moreover, although the feedback type comb filter 38 introduces deterioration in the picture quality with respect to the signal component having no vertical correlation, the equalizer circuit 42 cannot compensate for this deterioration when the equalizer circuit 42 is coupled in series at the input side of the feedback type comb filter 38. Therefore, it is desirable to couple the equalizer circuit 42 as shown in the embodiment described before.

Figure 10:
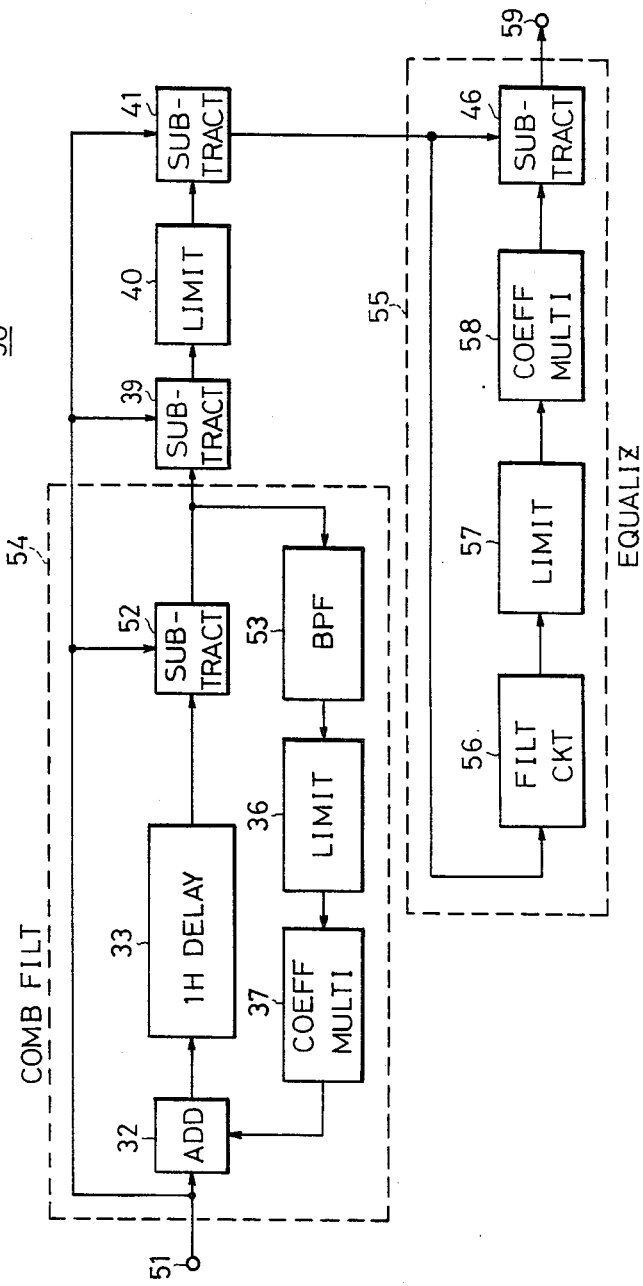
FIG. 10 is a systematic block diagram showing another embodiment of the noise reduction circuit according to the present invention.

Next, description will be given with respect to another embodiment of the noise reduction circuit according to the present invention, by referring to FIG. 10. In FIG. 10, those parts which are the same as those corresponding parts in FIG. 3 are designated by the same reference numerals, and their description will be omitted.

In FIG. 10, an NTSC system carrier chrominance signal which is reproduced from a recording medium, for example, is applied to an input terminal 51 of a noise reduction circuit 50. The input carrier chrominance signal is supplied to a subtracting circuit 52 and is subjected to a subtraction with the output signal of the 1H delay circuit 33. An output signal of the subtracting circuit 52 is supplied to a bandpass filter 53. A signal component in a narrow band which is within a frequency range symmetrical about the chrominance subcarrier frequency of the carrier chrominance signal, is filtered and obtained from the bandpass filter 53. The output signal of the bandpass filter 53 is passed through the limiter 36, the coefficient multiplier 37, the adding circuit 32, and is fed back to the input side of the 1H delay circuit 33.

A feedback type comb filter 54 shown in FIG. 10 has a frequency characteristic in which the center frequencies of the attenuation bands are even number multiples of $f_H/2$ and the center frequencies of the pass bands are odd number multiples of $f_H/2$. The frequency characteristic of the feedback type comb filter 54 is variable, that is, the peak levels of the pass bands and the amplitude of the pass bands vary depending on the amplitude of the input carrier chrominance signal and depending on the extent to which the vertical correlation exists in the input carrier chrominance signal. The carrier chrominance signal which is obtained from the feedback type comb filter 54, is passed through the subtracting circuit 39, the limiter 40, and the subtracting circuit 41, and is supplied to the subtracting circuit 46.

An equalizer circuit 55 comprises a filter circuit 56, a limiter 57, a coefficient multiplier 58, and the subtracting circuit 46. The frequency characteristic of the equalizer circuit 55 is complementary to the envelope characteristic in the frequency characteristic of the feedback type comb filter 54. Accordingly, a carrier chrominance signal which is reduced of the noise, is produced from the subtracting circuit 46 and is obtained through an output terminal 59.

The present invention is not limited to the embodiments described heretofore. For example, since there is a predetermined limit to the frequency band of the input video signal (luminance signal, color difference signal, primary color signal, or the like) which is applied to the input terminal 31, it is possible to employ instead of the highpass filter 35 a bandpass filter having a cutoff frequency which is in the range of a maximum frequency of the input video signal.

Figure 11:
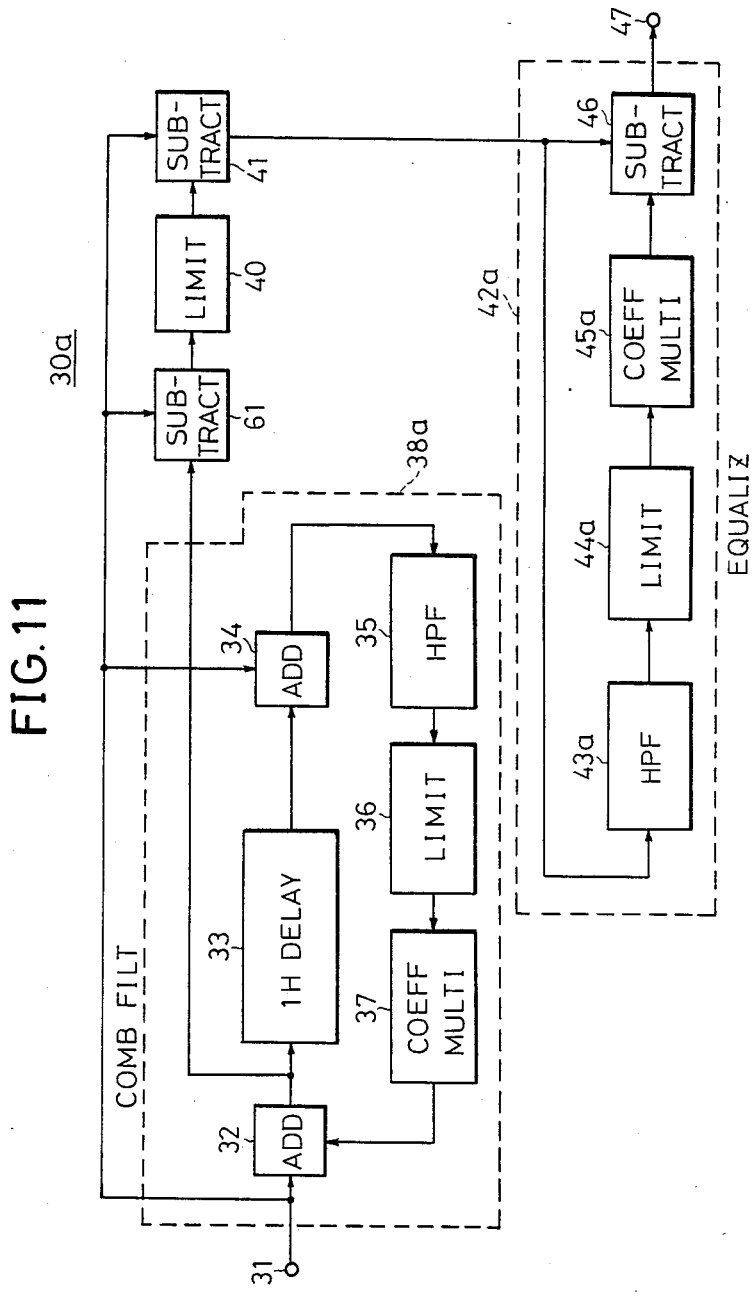
FIG. 11 is a systematic block diagram showing a modification of the noise reduction circuit according to the present invention.

The video signal which is obtained from the feedback type comb filter 38 or 54 and is supplied to a circuit in the subsequent stage, may be obtained from the input side or the output side of the 1H delay circuit 33. FIG. 11 shows a noise reduction circuit 30a in which the output video signal of a feedback type comb filter 38a is obtained from the input side of the 1H delay circuit 33. In FIG. 11, those parts which are the same as those corresponding parts in FIG. 3 are designated by the same reference numerals, and their description will be omitted. The construction of the feedback type comb filter 38a shown in FIG. 11 is the same as the construction of the feedback type comb filter 38 shown in FIG. 3, however, the output video signal of the feedback type comb filter 38a is obtained from the input side of the 1H delay circuit 33. For this reason, the envelope characteristic in the frequency characteristic of the feedback type comb filter 38a shown in FIG. 11 is different from the envelope characteristic in the frequency characteristic of the feedback type comb filter 38 shown in FIG. 3. Further, although the construction of an equalizer circuit 42a shown in FIG. 11 is the same as the construction of the equalizer circuit 42 shown in FIG. 3, constants of a highpass filter 43a, a limiter 44a, and a coefficient multiplier 45a shown in FIG. 11 are selected to values which are different from those of the highpass filter 43, the limiter 44, and the coefficient multiplier 45 shown in FIG. 3, so that the frequency characteristic of the equalizer circuit 42a is complementary to the frequency characteristic of the feedback type comb filter 38a.

The circuit which constitutes the feedback type comb filter 38, 38a, or 54, comprises the highpass filter 35 or the bandpass filter 53, the limiter 36, and the coefficient multiplier 37. However, the sequence in which the highpass filter 35 or the bandpass filter 53, the limiter 36, and the coefficient multiplier 37 are coupled in series, is not limited to the embodiments described heretofore. The limiter 36 must be coupled to the output side of the highpass filter 35 or the bandpass filter 53, however, the coefficient multiplier 37 may be coupled to the input side of the limiter 36 or to the input side of the highpass filter 35 or the bandpass filter 53. This holds true for the highpass filter 43, the limiter 44, and the coefficient multiplier 45 of the equalizer circuit 42, and for the highpass filter 56, the limiter 57, and the coefficient multiplier 58 of the equalizer circuit 55.

In addition, the present invention can be applied to the noise reduction of a luminance signal within a PAL system or SECAM system color video signal, and also to a carrier chrominance signal within the PAL system color video signal. In this case, it is possible to use a 2H delay circuit instead of the 1H delay circuit. Moreover, the frequency of the curving point in the frequency characteristic of the equalizer circuit 42 or 55 need not coincide with that of the feedback type comb filter 38 or 54, and may be selected to other frequencies.

Further, the present invention is not limited to these embodiments, but various variations and modifications may be made without departing from the scope of the present invention.

What is claimed is:

1. A noise reduction circuit for a video signal, said noise reduction circuit comprising:
    a feedback type comb filter in which an output video signal of a delay circuit which delays a video signal by one or two horizontal scanning periods, is fed back to an input side of said delay circuit through a feedback path, said feedback path comprising a highpass or bandpass filter circuit, a first limiter, and a first coefficient multiplier which are coupled in series; and
    an equalizer circuit supplied with an output video signal of said feedback type comb filter, said equalizer circuit having a frequency characteristic approximately complementary to an envelope characteristic in a frequency characteristic of said feedback type comb filter.

2. A noise reduction circuit as claimed in claim 1 in which said feedback type comb filter comprises:
    an input terminal applied with an input video signal which is to be reduced of noise, said delay circuit, an operation circuit for performing an addition or a subtraction between the output video signal of said delay circuit and the input video signal applied to said input terminal, said feedback path supplied with an output signal of said operation circuit, said feedback path comprising said highpass or bandpass filter circuit for filtering a predetermined frequency component of the output signal of said operation circuit, a first limiter essentially supplied with an output signal of said highpass or bandpass filter circuit, for amplitude-limiting an amplitude part which is larger than a limiting level of said first limiter, and said coefficient multiplier coupled in series to an input side or an output side of said first limiter, for multiplying a coefficient, and an adding circuit for adding an output signal of said feedback path and the input video signal applied to said input terminal, and for supplying an output signal to said delay circuit,
    and said equalizer circuit comprises:
    a filter circuit supplied with an output signal of said feedback type comb filter, for filtering a predetermined frequency component, a second limiter essentially supplied with an output signal of said filter circuit, for amplitude limiting the output signal of said filter circuit, a second coefficient multiplier coupled in series to an input side or an output side of said filter circuit or coupled in series to an output side of said second limiter, for multiplying a coefficient, a subtracting circuit for performing a subtraction between the output signal of said feedback type comb filter and an output signal of a specific circuit, said specific circuit being constituted by said filter circuit, said second limiter, and said second coefficient multiplier which are coupled in series, and an output terminal through which an output video signal of said subtracting circuit is obtained.

3. A noise reduction circuit for a video signal, said noise reduction circuit comprising:
    a feedback type comb filter in which an output video signal of a delay circuit which delays a video signal by one or two horizontal scanning periods, is fed back to an input side of said delay circuit through a feedback path, said feedback path comprising a highpass or bandpass filter circuit, a first limiter, and a first coefficient multiplier which are coupled in series;

a first subtracting circuit for subtracting an output video signal of said feedback type comb filter from an input signal of said feedback type comb filter;

a second limiter for amplitude-limiting an output signal of said first subtracting circuit;

a second subtracting circuit for subtracting an output signal of said second limiter from the input signal of said feedback type comb filter; and an equalizer circuit supplied with an output signal of said second subtracting circuit, said equalizer circuit having a frequency characteristic approximately complementary to an envelope characteristic in a frequency characteristic of said feedback type comb filter.

4. A noise reduction circuit as claimed in claim 3 in which said feedback type comb filter comprises:

an input terminal applied with an input video signal which is to be reduced of noise, said delay circuit, an operation circuit for performing an addition or a subtraction between the output video signal of said delay circuit and the input video signal applied to said input terminal, said feedback path supplied with an output signal of said operation circuit, said feedback path comprising said highpass or bandpass filter circuit for filtering a predetermined frequency component of the output signal of said operation circuit, said first limiter essentially supplied with an output signal of said highpass or bandpass filter circuit, for amplitude-limiting an amplitude part which is larger than a limiting level of said first limiter, and said first coefficient multiplier coupled in series to an input side or an output side of said first limiter, for multiplying a coefficient, and an adding circuit for adding an output signal of said feedback path and the input video signal applied to said input terminal, and for supplying an output signal to said delay circuit, and said equalizer circuit comprises:

a filter circuit supplied with an output signal of said second subtracting circuit, for filtering a predetermined frequency component, a third limiter essentially supplied with an output signal of said filter circuit, for amplitude-limiting the output signal of said filter circuit, a second coefficient multiplier coupled in series to an input side or an output side of said filter circuit or coupled in series to an output side of said third limiter, for multiplying a coefficient, a third subtracting circuit for performing a subtraction between the output signal of said second subtracting circuit and an output signal of a specific circuit, said specific circuit being constituted by said filter circuit, said third limiter, and said second coefficient multiplier which are coupled in series, and an output terminal through which an output video signal of said third subtracting circuit is obtained.

* * * * *